United States Patent
Pohlman et al.

(10) Patent No.: US 8,819,939 B2
(45) Date of Patent: Sep. 2, 2014

(54) METHOD OF MANUFACTURING A SPLIT BEARING RING

(75) Inventors: Jon F. V. Pohlman, Greenville, SC (US); Anthony P. Copper, Greenville, SC (US)

(73) Assignee: Koyo Bearings USA LLC, Westlake, OH (US)

( * ) Notice: Subject to any disclaimer, the term of this patent is extended or adjusted under 35 U.S.C. 154(b) by 319 days.

(21) Appl. No.: 12/990,464

(22) PCT Filed: Aug. 20, 2009

(86) PCT No.: PCT/US2009/054418
§ 371 (c)(1),
(2), (4) Date: Oct. 29, 2010

(87) PCT Pub. No.: WO2010/027684
PCT Pub. Date: Mar. 11, 2010

(65) Prior Publication Data
US 2011/0035943 A1    Feb. 17, 2011

Related U.S. Application Data

(60) Provisional application No. 61/094,234, filed on Sep. 4, 2008.

(51) Int. Cl.
*B21D 53/10* (2006.01)

(52) U.S. Cl.
USPC ............... 29/898.066; 29/898.063; 384/273

(58) Field of Classification Search
USPC ............ 29/898, 898.063, 898.066; 384/273
See application file for complete search history.

(56) References Cited

U.S. PATENT DOCUMENTS

| | | | | |
|---|---|---|---|---|
| 1,375,020 A * | 4/1921 | Sellew | | 219/104 |
| 2,016,924 A | 10/1935 | Herrmann | | |
| 3,140,130 A * | 7/1964 | Barr | | 384/570 |
| 3,343,895 A * | 9/1967 | Morrison | | 384/501 |
| 3,546,762 A * | 12/1970 | Martin | | 29/898.063 |
| 3,619,548 A * | 11/1971 | Cavagnero | | 219/105 |
| 3,727,999 A * | 4/1973 | Dunn et al. | | 384/569 |
| 3,871,093 A * | 3/1975 | Ladin | | 29/898.066 |

(Continued)

FOREIGN PATENT DOCUMENTS

| | | |
|---|---|---|
| GB | 1452378 A | 10/1976 |
| GB | 2064387 A | 6/1981 |

(Continued)

OTHER PUBLICATIONS

PCT International Search Report and Written Opinion, dated Oct. 23, 2009.

(Continued)

*Primary Examiner* — David Bryant
*Assistant Examiner* — Ruth G Hidalgo-Hernande
(74) *Attorney, Agent, or Firm* — Nelson Mullins Riley & Scarborough, LLP

(57) ABSTRACT

A method of manufacturing a split bearing ring comprises forming an endless ring (42) having first (34) and second edges (46), removing at least a portion of the ring between the first and second edges to form at least one aperture (50, 54), hardening the ring, and after hardening, splitting the ring adjacent the at least one aperture to create first and second mating ends (74, 78) of the ring.

15 Claims, 4 Drawing Sheets

(56) References Cited

U.S. PATENT DOCUMENTS

| | | | |
|---|---|---|---|
| 4,240,682 A | | 12/1980 | Benson |
| 4,412,372 A | * | 11/1983 | Olschewski et al. ..... 29/898.066 |
| 4,475,777 A | * | 10/1984 | Hofmann et al. ............. 384/572 |
| 4,541,157 A | * | 9/1985 | Tsushima et al. ........ 29/898.066 |
| 4,643,595 A | * | 2/1987 | Weavers ....................... 384/503 |
| 4,821,386 A | * | 4/1989 | Simon et al. ............. 29/898.066 |
| 5,199,170 A | * | 4/1993 | Mori et al. ................. 29/898 |
| 5,261,159 A | * | 11/1993 | Yasuda et al. ............ 29/898.066 |
| 5,287,623 A | * | 2/1994 | Francis et al. ........... 29/898.062 |
| 5,405,201 A | * | 4/1995 | Senger .......................... 384/273 |
| 5,630,669 A | * | 5/1997 | Stewart ......................... 384/570 |
| 5,711,074 A | * | 1/1998 | Harimoto et al. ........ 29/898.066 |
| 6,485,186 B2 | * | 11/2002 | Wood et al. ................... 384/499 |
| 7,270,484 B2 | * | 9/2007 | Waseda ......................... 384/570 |
| 2007/0116393 A1 | * | 5/2007 | Oishi et al. .................... 384/457 |
| 2007/0172168 A1 | * | 7/2007 | Oishi et al. .................... 384/569 |

FOREIGN PATENT DOCUMENTS

| | | |
|---|---|---|
| JP | S51-033245 | 3/1976 |
| JP | 52-79154 A | 7/1977 |
| JP | H03-077815 | 8/1991 |
| JP | H06-050350 | 2/1994 |
| JP | 2006-200670 A | 8/2006 |
| JP | 2006-292132 A | 10/2006 |

OTHER PUBLICATIONS

Office Action dated Sep. 18, 2012 for co-pending Korean Patent Application No. 10-2011-7002653.
Office Action dated Oct. 12, 2012 for co-pending Chinese Patent Application No. 200980130033.5.
Office Action dated Nov. 9, 2012 for corresponding Japanese Patent Application No. 2011-518962.
Office Action dated Apr. 3, 2013 for corresponding European Patent Application No. 09791711.6.
Second Office Action dated May 22, 2013 for corresponding Chinese Patent Application No. 200980130033.5.
Notice of Last Preliminary Rejection dated May 27, 2013 for corresponding Korean Patent Application No. 10-2011-7002653.
Office Action dated Jul. 12, 2013 for Japanese Patent Application No. 2011-518962.
Response to Office Action Apr. 3, 2013 for European Patent Application No. 09 791 711.6-2424.
Rejection Decision dated Nov. 11, 2013 for Chinese Patent Application No. 200980130033.5.
Office Action dated Jun. 13, 2014 for corresponding Japanese Divisional Application No. 2013-233858.

* cited by examiner

METHOD OF MANUFACTURING A SPLIT BEARING RING

RELATED APPLICATIONS

This applications claims priority to U.S. Provisional Patent Application No. 61/094,234, filed Sep. 4, 2008, the entire content of which is hereby incorporated by reference herein.

BACKGROUND

The present invention relates to bearing rings that provide bearing raceways, and more particularly, to split bearing rings that provide bearing raceways.

Bearings and bearing raceways are often utilized to support a rotating shaft. The bearing raceways often wrap around the shaft, and the rolling elements are positioned between the shaft and the bearing raceways. Split bearing rings permit the bearing ring to be positioned onto the shaft without removing the shaft. One example of a split bearing ring is given in U.S. Pat. No. 6,485,186, the entire content of which is incorporated by reference herein. A split bearing ring is formed by wrapping a metal strip into a circle. The ends of the metal strip mate and are temporarily held together by two small welds. The ring is then heat treated and subsequently separated by breaking the welds, to form a split bearing ring. Another known bearing ring arrangement includes two bearing ring halves that form a two-piece bearing ring.

SUMMARY OF THE INVENTION

The present invention provides an improved method of manufacturing a split bearing ring that can maintain roundness during hardening.

Specifically, the invention provides a method of manufacturing a split bearing ring including forming an endless ring having first and second edges, removing at least a portion of the ring between the first and second edges to form at least one aperture, hardening the ring and after hardening, and splitting the ring adjacent the at least one aperture to create first and second mating ends of the ring.

In another embodiment, the invention provides a method of manufacturing a split bearing ring including forming an endless ring having first and second edges, removing a first portion of the ring between the first and second edges to form a first aperture, removing a second portion of the ring between the first and second edges to form a second aperture spaced from the first aperture, hardening the ring, and after hardening, splitting the ring adjacent the first aperture to create a first end of the ring and splitting the ring adjacent the second aperture to create a second end of the ring.

Other aspects of the invention will become apparent by consideration of the detailed description and accompanying drawings.

DETAILED DESCRIPTION

Before any embodiments of the present invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
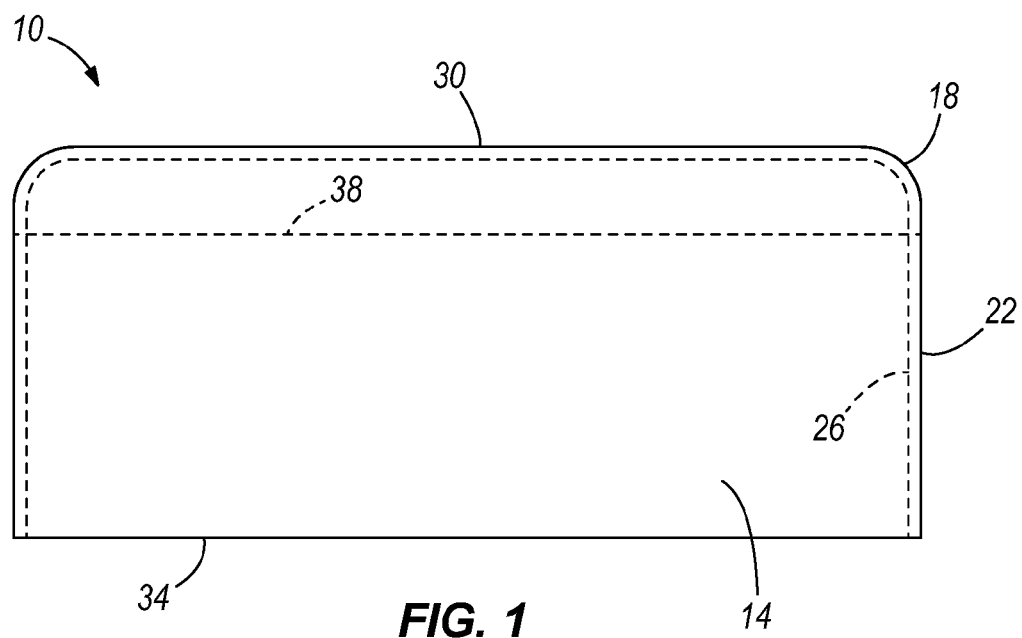
FIG. 1 is a side view of a ring including a shoulder.

With reference to FIG. 1, a drawn cup 10 having a ring portion 14 and an end or shoulder portion 18 is illustrated. The drawn cup 10 is formed from a sheet metal disk and drawn to have a cup-like shape. The ring portion 14 has a generally constant diameter outer surface 22 that extends generally in a circle, and a generally constant diameter inner surface 26 that is spaced radially inwardly from the outer surface 22 to form a cylindrical ring. The shoulder portion 18 curves inwardly from the outer surface 22 to form a substantially planar end surface 30. In another embodiment, the drawn cup or ring is formed from a sheet metal disk with an aperture formed therein. Such a drawn cup or ring includes a shoulder or flange that partially extends from the outer surface, to form a substantially planar end surface that includes an aperture therein.

The drawn cup 10 includes a first edge 34 that is spaced from and substantially parallel to the planar end surface 30. The first edge 34 is defined by a narrow ring-shaped surface that extends between the outer surface 22 and the inner surface 26. A dotted line 38 illustrates the boundary between the ring portion 14 and the shoulder portion 18.

Figure 2:
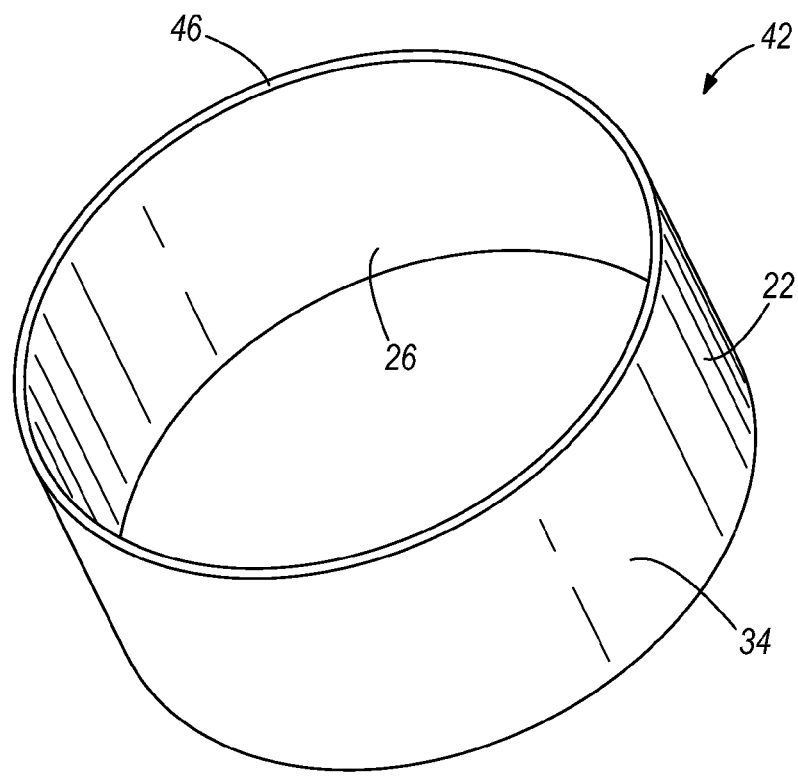
FIG. 2 is a perspective view of the ring shown with the shoulder removed.

The shoulder portion 18 can be removed from the ring portion 14 to form an endless ring 42, as illustrated in FIG. 2. The endless ring 42 includes the first edge 34 and a second edge 46, both of which extend between the outer surface 22 and the inner surface 26. In another embodiment, a hollow tube can be cut to form an endless ring 42, instead of drawing a disk and removing the shoulder. Other methods of forming a cylindrical, endless ring with the flexibility to be elastically deformed to open and close around a shaft (as described below) can also be used.

Figure 3:
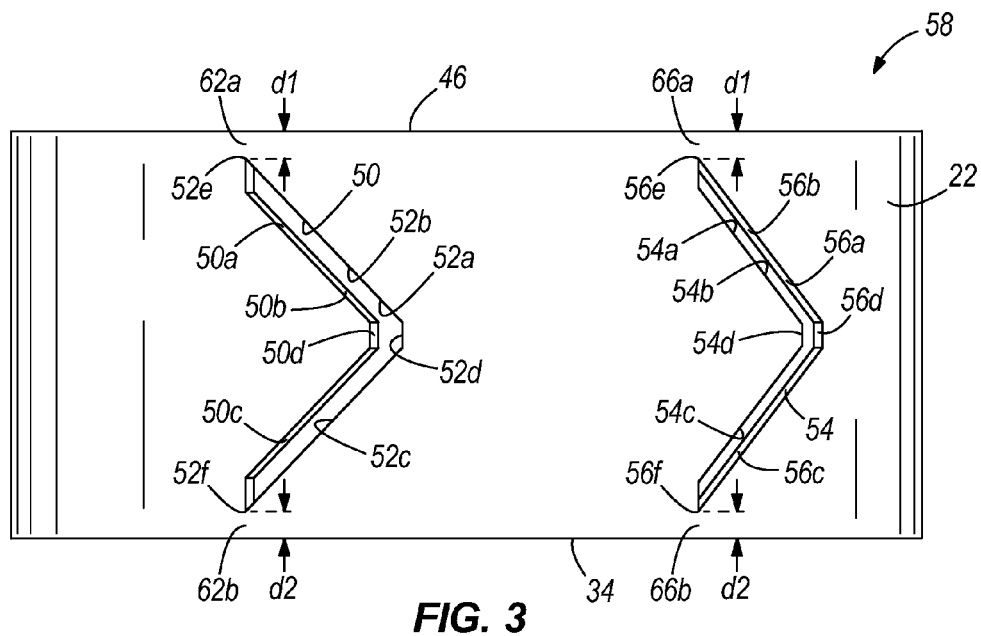
FIG. 3 is a side view of the ring with two apertures formed therein.
Figure 4:
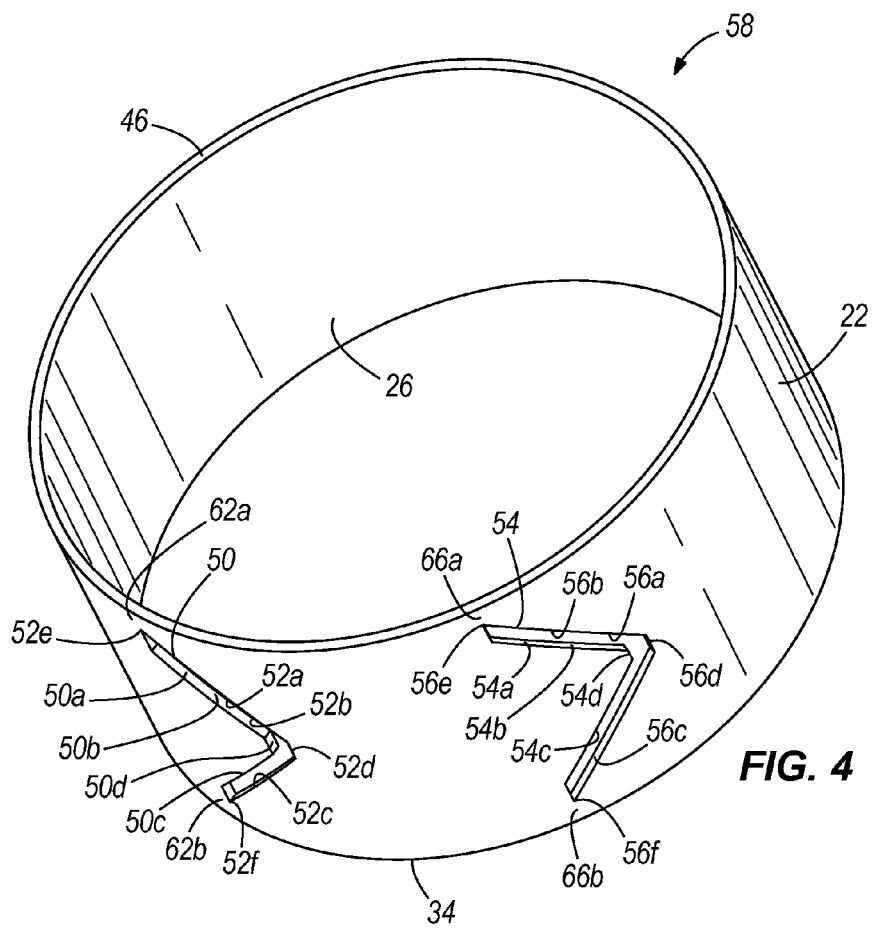
FIG. 4 is a perspective view of the ring of FIG. 3.

At least a portion of the endless ring 42 is removed to form at least one aperture. In some embodiments, only a single aperture will be formed. In the illustrated embodiment, a first aperture 50 and a second aperture 54 are formed to create an apertured ring 58, as shown in FIGS. 3 and 4. The apertures 50, 54 can be punched, pierced, machined, drilled, or otherwise formed in the endless ring 42. The apertures 50, 54 are formed between the first edge 34 and the second edge 46. In one embodiment, the apertures are created in the raw material prior to the forming process to create the endless ring 42.

In the illustrated embodiment, the apertures 50, 54 are substantially chevron-shaped or V-shaped and point in the same direction. In another embodiment, the apertures are substantially C-shaped. In yet another embodiment, the apertures are substantially S-shaped. Other shapes and configurations are possible and are considered to be within the scope of the present invention. The aperture 50 is bounded by a first V-shaped edge 50a and a second V-shaped edge 52a spaced from the first V-shaped edge 50a. The first V-shaped edge 50a and the second V-shaped edge 52a each include respective first legs 50b, 52b, second legs 50c, 52c and middle apices 50d, 52d. The illustrated first legs 50b, 52b are substantially parallel along the circumference of the apertured ring 58.

Likewise, the illustrated second legs 50c, 52c are substantially parallel along the circumference of the apertured ring 58. The illustrated apices 50d, 52d are substantially aligned and are positioned between the respective first legs 50b, 52b and second legs 50c, 52c. In one embodiment, the first legs 50b, 52b are angled between about 45 degrees and about 135 degrees from the second legs 50c, 52c. In another embodiment, the first legs 50b, 52b are angled at about 90 degrees from the second legs 50c, 52c. These angles are given by way of example only and are not intended to limit the scope of the present invention.

Similarly, the aperture 54 is bounded by a first V-shaped edge 54a and a second V-shaped edge 56a spaced from the first V-shaped edge 54a. The first V-shaped edge 54a and the second V-shaped edge 56a each include respective first legs 54b, 56b, second legs 54c, 56c and middle apices 54d, 56d. The illustrated first legs 54b, 56b are substantially parallel along the circumference of the apertured ring 58. Likewise, the illustrated second legs 54c, 56c are substantially parallel along the circumference of the apertured ring 58. The illustrated apices 54d, 56d are substantially aligned and are positioned between the respective first legs 54b, 56b and second legs 54c, 56c. In one embodiment, the first legs 54b, 56b are angled between about 45 degrees and about 135 degrees from the second legs 54c, 56c. In another embodiment, the first legs 54b, 56b are angled at about 90 degrees from the second legs 54c, 56c. These angles are given by way of example only and are not intended to limit the scope of the present invention.

First legs 52b, 56b extend from the respective middle apices 52d, 56d toward the second edge 46 and end at respective end points 52e, 56e. The end points 52e, 56e are each spaced a distance d1 (see FIG. 3) away from the second edge 46. The apertured ring 58 thereby includes first tabs 62a, 66a of material that extend between the respective end points 52e, 56e and the second edge 46. The first tab 62a of material is positioned adjacent the first aperture 50 and the first tab 66a of material is positioned adjacent the second aperture 54. The tabs 62a, 66a increase the rigidity of the apertured ring 58 as compared to a ring that is split entirely from edge to edge.

Second legs 52c, 56c extend from the respective middle apices 52d, 56d toward the first edge 34 and end at respective end points 52f, 56f. The end points 52f, 56f are each spaced a distance d2 (see FIG. 3) away from the first edge 34. The apertured ring 58 thereby includes second tabs 62b, 66b of material that extend between the respective end points 52f, 56f and the first edge 34. The second tab 62b of material is positioned adjacent the first aperture 50 and the second tab 66b of material is positioned adjacent the second aperture 54. The tabs 62a, 66a increase the rigidity of the apertured ring 58 as compared to a ring that is split entirely from edge to edge.

After the apertures are formed in the endless ring 42, the apertured ring 58 is hardened by heat treatment or other similar hardening process. Hardening imparts residual stresses into the apertured ring 58. The resolution of the internal stress state of the part to its equilibrium point can deform the ring, such that the ring becomes misshapen and out-of-round. The tabs 62a, 62b, 66a, 66b increase the rigidity of the apertured ring 58 to reduce or prevent deformation of the apertured ring 58 in response to the hardening process. Since the apertured ring 58 includes the tabs 62a, 62b, 66a, 66b, the apertured ring 58 forms a complete circle, and is more able to resist deformation than a ring that is split entirely from edge to edge. The arrangement of the present invention inhibits warping during hardening, such that the apertured ring 58 retains it roundness and prevents twist. This ultimately increases the lifetime of the bearing made with the ring 58.

The apertured ring 58 can be hardened by case carburizing, through hardening, or by other hardening treatments, depending at least in part on the apertured ring 58 material. For example, if the apertured ring 58 is 1012 steel or 1524 steel, the apertured ring 58 may best be hardened by case carburizing, or if the apertured ring 58 is 1074 steel, the apertured ring 58 may best be hardened by through hardening. One skilled in the art will understand that other materials and hardening processes can be used.

After the hardening operation, the tabs 62a, 62b, 66a, 66b are broken by squeezing, punching, clipping, pulling or other similar operation to fracture and/or remove the material between the apertures 50, 54. When the tabs 62a, 62b, 66a, 66b are broken, jagged or rough edges can result between end points 52e, 56e and the second edge 46, and between end points 52f, 56f and the first edge 34. A tumbling process or other similar smoothing process can be used to remove burrs or excess material after the tabs 62a, 62b, 66a, 66b are broken.

Figure 5:
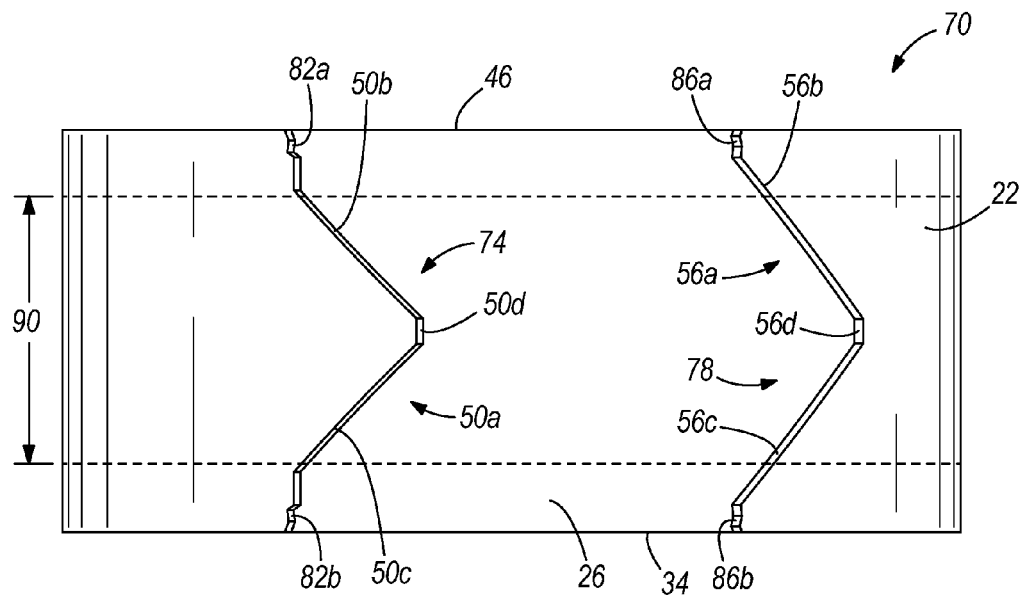
FIG. 5 is a side view of the ring of FIGS. 3 and 4 with a portion of the ring removed.
Figure 6:
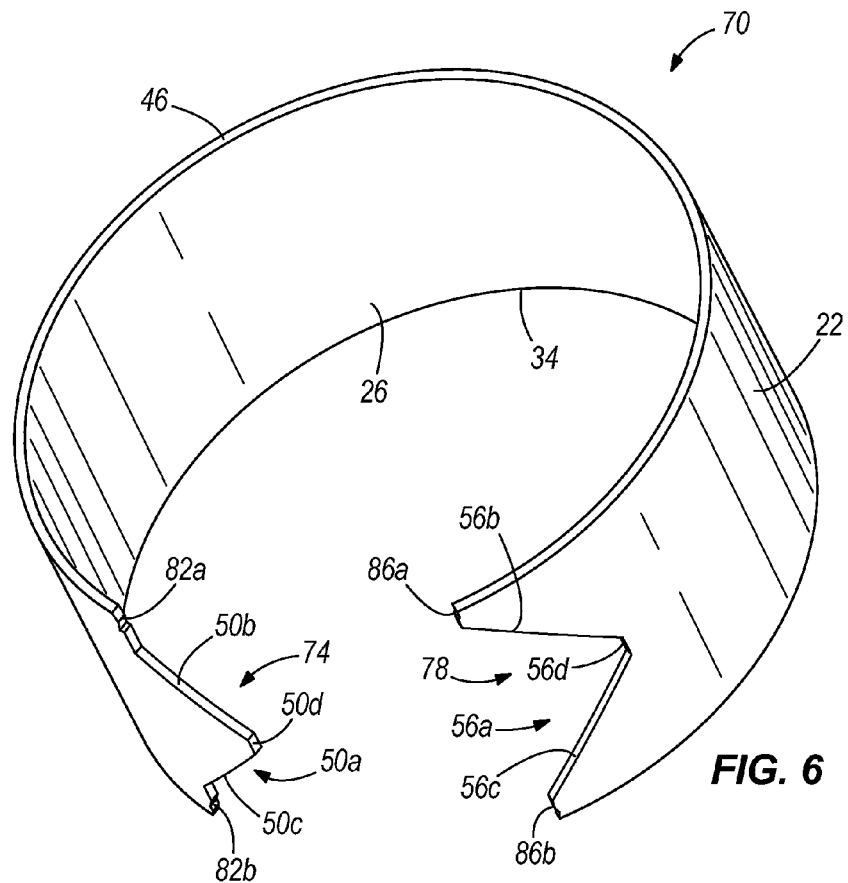
FIG. 6 is a perspective view of the ring of FIG. 5.

When the material between the apertures 50, 54 is removed, a substantially c-shaped split ring 70 results, as shown in FIGS. 5 and 6. The split ring 70 includes a first end 74 and a second end 78 that substantially mates with the first end 74. The illustrated first end 74 is substantially convex and is at least partially defined by the first V-shaped edge 50a, including the first leg 50b, the second leg 50c and the middle apex 50d. The first end 74 is further defined by a first rough edge 82a positioned between the first leg 50b and the second edge 46, and a second rough edge 82b positioned between the second leg 50c and the first edge 34. As described above, a tumbling process can be used to smooth out the first and second rough edges 82a, 82b, but some roughness may remain. The illustrated rough edges 82a, 82b extend substantially perpendicularly to the first edge 34 and the second edge 46.

The illustrated second end 78 is substantially concave and is at least partially defined by the second V-shaped edge 56a, including the first leg 56b, the second leg 56c and the middle apex 56d. The second end 78 is further defined by a third rough edge 86a positioned between the first leg 56b and the second edge 46, and a fourth rough edge 86b positioned between the second leg 56c and the first edge 34.

The method of manufacturing described above substantially reduces or inhibits warping of the apertured ring 58 during hardening, such that the split ring 70 has a substantially round shape, in both an open and a closed position. Also, the first end 74 and the second end 78 have mating profiles that substantially abut or engage when the split ring 70 is squeezed. Further, the manufacturing method described above provides improved stress distribution across the split ring 70 as the split ring 70 is opened to receive the shaft and squeezed to close the split ring 70 around the shaft. Elastic deformation occurs during assembly onto the shaft, but plastic deformation should not. Plastic deformation during assembly could result in the split ring 70 not closing correctly and having residual stresses that may cause the raceway to not function properly. Extreme plastic deformation that would cause fracture or cracking of the raceway surface could introduce debris into the bearing and an uncontrolled, irregular area, thereby reducing bearing durability. One skilled in the art will understand that known relationships, such as those well-documented for piston ring design, for example, can be used to effectively design the geometry of the split ring 70 for specific applications. For example, Castigliano's method can be used to determine both the force required to open the split ring 70 to install over a shaft and to close the split ring 70 about the shaft. Bending moments and related surface stresses can be determined, and those stresses can be compared to material yield stresses to select the appropriate material and geometry for a specific application.

The split ring 70 can be inserted onto a shaft without requiring the shaft to be uncoupled from a machine that is driven by or drives the shaft. The split ring 70 can be spread, such that the first end 74 and the second end 78 permit the shaft to be inserted therebetween. A plurality of rolling elements 94, such as rollers, needles or balls, can be inserted between the shaft and the split ring 70 to permit rotation of the shaft with respect to the split ring 70.

Figure 7:
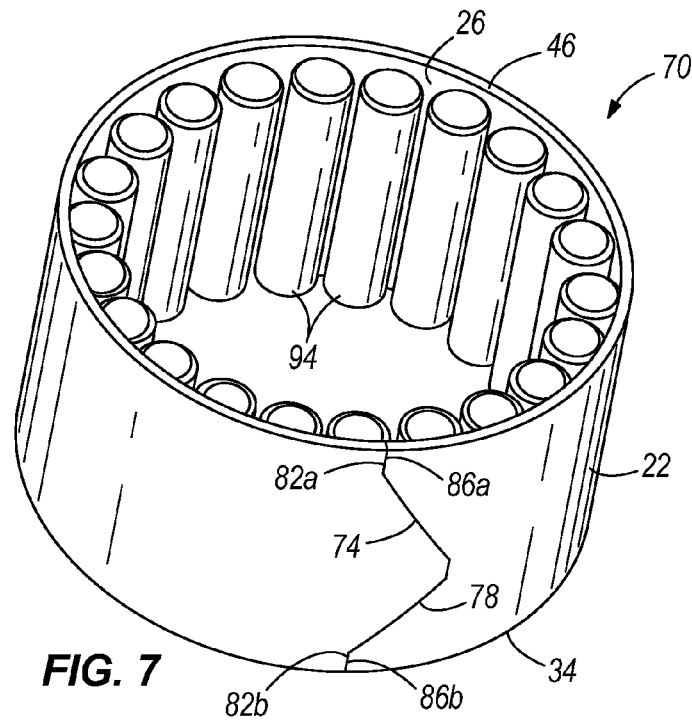
FIG. 7 is a perspective view of the ring of FIG. 6 in a closed position and shown containing rolling elements.
Figure 8:
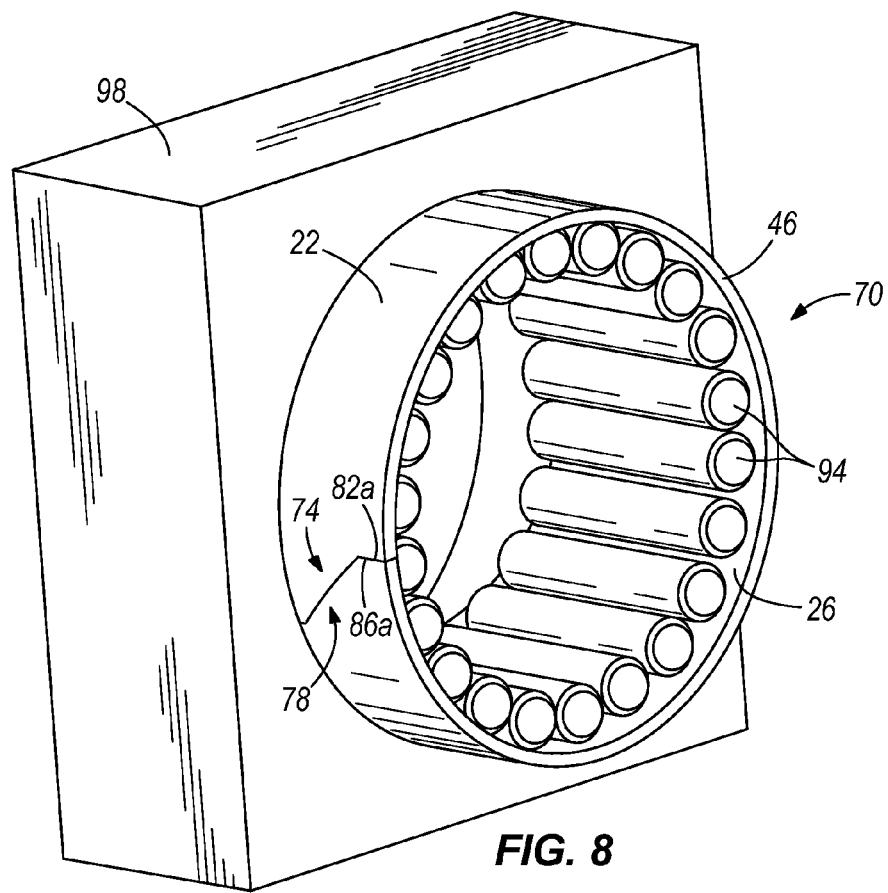
FIG. 8 is a perspective view of the ring of FIG. 7 positioned at least partially within a housing.

FIGS. 7 and 8 illustrate the split ring 70 in a closed position, such that at least a portion of the first end 74 substantially abuts at least a portion of the second end 78. The manufacturing process disclosed herein results in a more accurate roundness tolerance in the split rings 70. Therefore, the rings produced by the disclosed method have a more consistent diameter and are therefore more round.

FIGS. 7 and 8 illustrate the split ring 70 with a plurality of rolling elements 94 in abutment with the split ring 70. The plurality of rolling elements 94 are sized and located to travel along the inner surface 26 of the split ring 70 between the first and second rough edges 82a, 82b, 86a, and 86b. For example, the plurality of rolling elements 94 are positioned in the roller zone 90, shown in FIG. 5. The first and second rough edges 82a, 82b, 86a, and 86b can damage the plurality of rolling elements 94 and can reduce the lifetime of the bearing. Positioning the plurality of rolling elements 94 away from the first and second rough edges 82a, 82b, 86a and 86b lowers the friction between the plurality of rolling elements 94 and the split ring 70.

FIG. 8 illustrates the split ring 70 held in the squeezed position by a portion of a housing 98 surrounding the split ring 70. In other embodiments, the split ring 70 can be maintained in the squeezed position by a clamp, collar, sleeve, or other similar arrangement. In yet other embodiments, the split ring 70 can be used as an inner raceway wrapped on a shaft with the rolling elements traveling on the outer diameter surface of the split ring 70.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. Various features and advantages of the invention are set forth in the following claims.

What is claimed is:

1. A method of manufacturing a split bearing ring, the method comprising:
   forming an endless ring having first and second edges;
   removing at least a portion of the ring between the first and second edges to form at least one V-shaped aperture having at least a V-shaped first edge and a V-shaped second edge that are both spaced from each other along the circumference of the ring and substantially parallel along the circumference of the ring;
   hardening the ring;
   after hardening, splitting the ring adjacent the at least one aperture to create first and second mating ends of the ring; and
   abutting the first mating end and the second mating end of the ring to each other so that the first edge abuts the second edge.

2. The method of claim 1, wherein removing at least a portion of the ring includes punching or piercing at least one aperture through the ring.

3. The method of claim 1, wherein hardening includes case carburizing.

4. The method of claim 1, wherein hardening includes through hardening.

5. The method of claim 1, wherein splitting the ring includes detaching a portion of the ring from the remainder of the ring.

6. The method of claim 1, further comprising removing a shoulder of material from the endless ring.

7. The method of claim 1, further comprising inserting a shaft between the first end and the second end.

8. The method of claim 1, wherein removing at least a portion of the ring further comprises forming at least one tab of material between one of the first and second edges and the at least one aperture.

9. The method of claim 1, wherein the at least one aperture includes a first aperture and a second aperture spaced from the first aperture.

10. The method of claim 9, wherein splitting the ring includes removing material from between the first aperture and the second aperture.

11. The method of claim 1, wherein forming the endless ring includes a drawing process.

12. A method of manufacturing a split bearing ring, the method comprising:
    forming an endless ring having first and second edges;
    removing a first portion of the ring between the first and second edges to form a first aperture;
    removing a second portion of the ring between the first and second edges to form a second aperture spaced from the first aperture so that a portion of the ring extends between the first aperture and the second aperture;
    hardening the ring; and
    after hardening, splitting the ring adjacent the first aperture to create a first end of the ring and splitting the ring adjacent the second aperture to create a second end of the ring;
    removing the portion of the ring that extends between the first aperture and the second aperture; and
    abutting the first end and the second end of the ring to each other.

13. The method of claim 12, wherein removing the first portion and the second portion of the ring includes punching or piercing the ring to form the first and second apertures.

14. The method of claim 12, wherein the first and second apertures are substantially V-shaped.

15. The method of claim 12, wherein forming the endless ring includes a drawing process.

* * * * *

UNITED STATES PATENT AND TRADEMARK OFFICE
CERTIFICATE OF CORRECTION

PATENT NO.         : 8,819,939 B2                                Page 1 of 1
APPLICATION NO.    : 12/990464
DATED              : September 2, 2014
INVENTOR(S)        : J. Pohlman et al.

It is certified that error appears in the above-identified patent and that said Letters Patent is hereby corrected as shown below:

ON THE TITLE PAGE

Other Publications, page 2, line 3, please change "Oct. 12, 2012" to -- Oct. 10, 2012 --

Signed and Sealed this
Seventeenth Day of May, 2016

Michelle K. Lee
*Director of the United States Patent and Trademark Office*